(12) United States Patent
Kitayama et al.

(10) Patent No.: US 8,132,846 B2
(45) Date of Patent: Mar. 13, 2012

(54) SLIDE HATCH ASSEMBLY

(75) Inventors: Kenichi Kitayama, Tochigi (JP); Michael A Schrader, Plain City, OH (US); Matthew Weyand Schmitt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/851,899

(22) Filed: Aug. 6, 2010

(65) Prior Publication Data

US 2012/0032471 A1 Feb. 9, 2012

(51) Int. Cl.
*B60J 5/12* (2006.01)
(52) U.S. Cl. ............... 296/146.8; 296/106; 296/216.02
(58) Field of Classification Search ............ 296/76, 296/106, 146.8, 216.02, 216.04, 216.05, 296/57.1, 147, 219, 217, 222, 100.01, 146.16, 296/165
See application file for complete search history.

(56) References Cited

U.S. PATENT DOCUMENTS

| | | | |
|---|---|---|---|
| 1,889,679 A | 11/1932 | Marin | |
| 2,086,091 A | 7/1937 | Payette | |
| 2,596,355 A | 5/1952 | Ackermans | |
| 2,997,336 A * | 8/1961 | Huggins et al. | 296/106 |
| 3,214,213 A | 10/1965 | Helzer, Jr. et al. | |
| 3,378,298 A | 4/1968 | Wingen | |
| 3,419,304 A | 12/1968 | Sangimino | |
| 4,272,121 A | 6/1981 | Kim | |
| 4,274,670 A | 6/1981 | Pitzmann | |
| 4,323,274 A | 4/1982 | Soderberg et al. | |
| 4,620,743 A | 11/1986 | Eke | |
| 4,659,136 A | 4/1987 | Martin et al. | |
| 4,707,014 A | 11/1987 | Rich | |
| 4,712,827 A | 12/1987 | Jensen | |
| 5,183,310 A | 2/1993 | Shaughnessy | |
| 5,294,170 A | 3/1994 | Hsueh | |
| 5,921,611 A | 7/1999 | Townsend | |
| 5,997,072 A | 12/1999 | Parkinson | |
| 6,007,139 A | 12/1999 | Shave | |
| 6,241,302 B1 | 6/2001 | Rehkopf | |
| 6,305,740 B1 * | 10/2001 | Staser et al. | 296/222 |
| 6,447,050 B1 | 9/2002 | Plassmeyer et al. | |
| 6,485,094 B2 | 11/2002 | Corder et al. | |

(Continued)

FOREIGN PATENT DOCUMENTS

DE 19513520 8/1996

(Continued)

OTHER PUBLICATIONS

Motorsnaps.com,http://www.motorsnaps.com/d28353-3/2002+Webasto++Welcome.jpg.*

(Continued)

*Primary Examiner* — Dennis Pedder
(74) *Attorney, Agent, or Firm* — Rankin Hill & Clark LLP

(57) ABSTRACT

A slide hatch assembly for selectively closing a rear cargo opening on a vehicle includes a hatch frame slidably mounted to a vehicle body of the vehicle. The hatch assembly further includes at least one front rail mounted to the vehicle body and at least one rear rail mounted to the vehicle body. At least one front roller assembly slidably connects the hatch frame to the at least one front rail and at least one rear roller assembly slidably connects the hatch frame to the at least one rear rail.

20 Claims, 8 Drawing Sheets

U.S. PATENT DOCUMENTS

| | | |
|---|---|---|
| 6,494,528 B2 | 12/2002 | Tolinski et al. |
| 6,505,878 B1 | 1/2003 | Mascolo |
| 6,695,377 B2 | 2/2004 | Palva et al. |
| 6,789,830 B2 | 9/2004 | Van Bussel |
| 6,874,838 B2 | 4/2005 | De Gaillard |
| 7,029,058 B2 | 4/2006 | Mathew |
| 7,032,962 B2 * | 4/2006 | Engelgau ............... 296/216.05 |
| 7,140,657 B2 | 11/2006 | Cuma |
| 7,334,833 B2 | 2/2008 | Koelbl et al. |
| 7,354,095 B2 | 4/2008 | Fleming et al. |
| 7,438,432 B2 | 10/2008 | Greenwood |
| 7,494,175 B2 | 2/2009 | Condon et al. |
| 7,651,148 B2 | 1/2010 | Hustyi et al. |
| 2005/0253406 A1 | 11/2005 | Faubert et al. |
| 2008/0315632 A1 * | 12/2008 | Righetti ........................ 296/217 |

FOREIGN PATENT DOCUMENTS

| | | |
|---|---|---|
| JP | 62210124 | 9/1987 |
| JP | 1289773 | 11/1989 |

OTHER PUBLICATIONS

Office Action of U.S. Appl. No. 12/851,813 dated Jul. 18, 2011.
Office Action of U.S. Appl. No. 12/851,889 dated Jul. 19, 2011.
Citroen C3 Pluriel—photographs 1 and 2.
Renault Be-Bop—photographs 1 and 2.
GMC Envoy XUV—photograph 1.
Webasto Welcome Concept—photograph 1.
Studebaker Wagonaire—photograph 1.
U.S. Appl. No. 12/851,813, filed Aug. 6, 2010, Titled "Dual Action Rear Hatch".
U.S. Appl. No. 12/851,987, filed Aug. 6, 2010, Titled "Spoiler for Rear Hatch Closure Assembly".
U.S. Appl. No. 12/851,889, filed Aug. 6, 2010, Titled "Closure Assembly for Vehicle".
Office Action of U.S. Appl. No. 12/851,889 dated Nov. 1, 2011.
Office Action of U.S. Appl. No. 12/851,813 dated Oct. 27, 2011.

* cited by examiner

SLIDE HATCH ASSEMBLY

BACKGROUND

The present disclosure generally relates to vehicles, and more particularly relates to a slide hatch assembly for a vehicle.

Vehicle design is often focused on providing increased and/or improved cargo carrying capabilities for vehicles. This is particularly important for smaller, compact vehicles where there is often limited space available to dedicate to carrying cargo. Many smaller vehicles incorporate a flip-up hatch closure on the rear of the vehicle for providing access into the rear of the vehicle. Some hatch closures include a lower hatch closure that flips down and an upper hatch closure that flips up. Whether the entire hatch closure or only an upper hatch closure flips-up, these designs are often limited in that the vehicle is not designed to be driven with the hatch closures in the flipped-up positions.

Several known vehicles are configured in an attempt to provide improved cargo carrying capabilities for the vehicle. One such vehicle is the 2004 Citroen C3 Pluriel. This vehicle has a retractable soft top with a pivotable closure provided in a rear portion of the soft top facing a rear of the vehicle, and also has a drop-down tailgate disposed below the pivotable closure in the rear of the vehicle. The pivotable closure can be pivoted upward and the tailgate pivoted downward to provide a large cargo opening into the rear of the vehicle. Drawbacks of this arrangement relate to the use of a soft top and range from undesirable road noise entering the vehicle to insufficient durability to limited theft prevention.

Another known vehicle is the Renault Be-Bop concept vehicle shown at the 2003 Frankfurt Motor Show. This vehicle has a rear tailgate and an adjacent sliding roof panel. The tailgate has a vertically retractable window and is configured as a swing-out tailgate (i.e., the tailgate is pivoted open about a vertical axis). The sliding roof panel is movable to a slide open position forward along the vehicle's roof. When the tailgate is in the swing-open position and the roof panel is slid open, a large cargo opening is provided (i.e., the cargo opening includes the opening normally closed by the tailgate combined with the opening normally closed by the sliding roof panel. Drawbacks associated with this vehicle include its boxy and truck-like appearance and its use of exterior tracks for the sliding roof panel, which exposes the tracks to environmental elements and contributes to an overall unsightly appearance. Another similar vehicle is the 2003-2004 GMC Envoy XUV, but this vehicle uses a powered sliding roof panel, which significantly increases costs of the Still another known vehicle is the Webasto Welcome concept vehicle shown in or about 2002. This vehicle has a drop-down tailgate and an adjacent sliding roof panel. The tailgate and the roof panel can both be moved to their respective open positions for providing a combined rear cargo opening. Drawbacks of this vehicle include a boxy rear end and a relatively small sized cargo opening. Also, this sliding hatch is not optimally designed for driving while in the open position.

An older example vehicle with a similar combined rear cargo opening is the 1963 Studebaker Wagoneer. This vehicle is believed to be one of the first mass produced vehicles to offer a transforming rear cargo area. It includes a tailgate having a rear window that slides or retracts down into the tailgate body and a sliding roof panel disposed adjacent the tailgate. Drawbacks associated with this vehicle include severe water leak issues and the use of the inconvenient sliding rear window.

SUMMARY

According to one aspect, a slide hatch assembly for selectively closing a rear cargo opening on a vehicle includes a hatch frame slidably mounted to a vehicle body of the vehicle. The hatch assembly further includes at least one front rail mounted to the vehicle body and at least one rear rail mounted to the vehicle body. At least one front roller assembly slidably connects the hatch frame to the at least one front rail and at least one rear roller assembly slidably connects the hatch frame to the at least one rear rail.

According to another aspect, a slide hatch assembly for a vehicle includes a hatch frame having a pair of front roller assemblies and a pair of rear roller assemblies. The slide hatch assembly also includes a pair of laterally spaced apart front rails and a pair of laterally spaced apart rear rails. The front rails each have an adjacent front roller from the pair of front roller assemblies received therein and the rear rails each have an adjacent rear roller from the pair of rear roller assemblies received therein.

According to a further aspect, a vehicle having a rear opening selectively closed by a sliding hatch includes a vehicle body defining the rear opening, rear rails fixedly mounted to the vehicle body along lateral edges of the vehicle body defining the rear opening and front rails fixedly mounted to the vehicle body forward of the rear opening. Roller assemblies slidably mount the sliding hatch to the rear rails and the front rails for sliding movement therealong.

DETAILED DESCRIPTION

Figure 1:
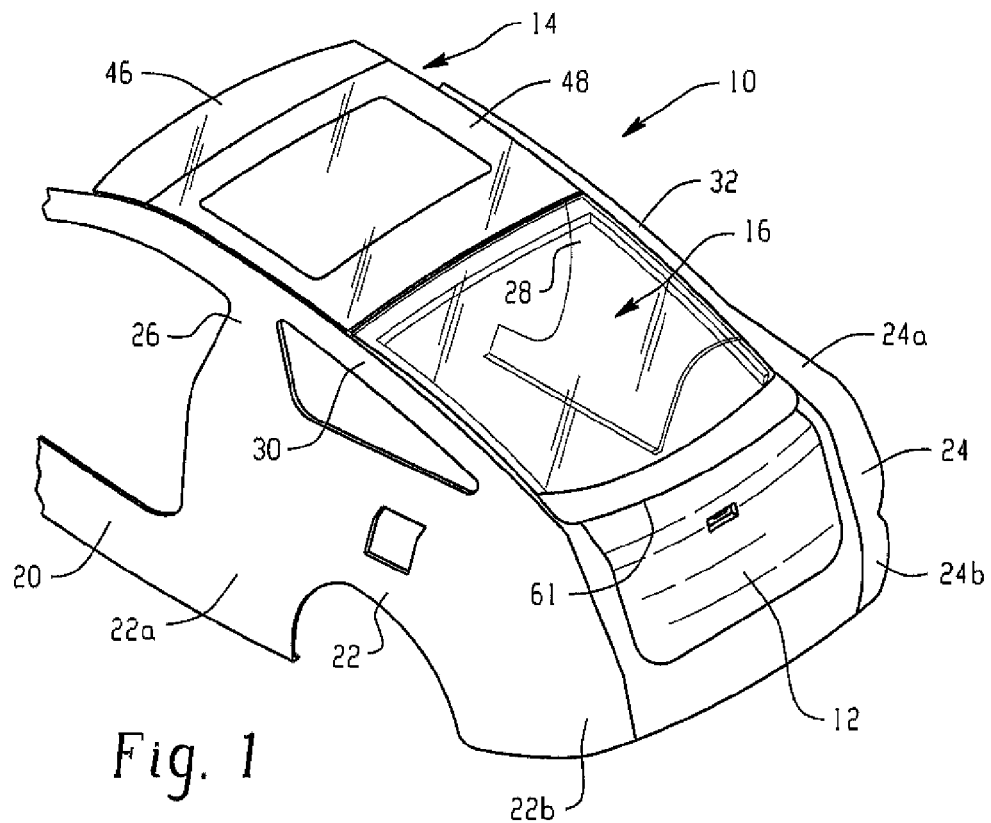
FIG. 1 is a schematic perspective view of a vehicle having a first closure slidably mounted to a vehicle body and a second closure pivotally mounted to the first closure, both closures shown in respective closed positions.
Figure 2:
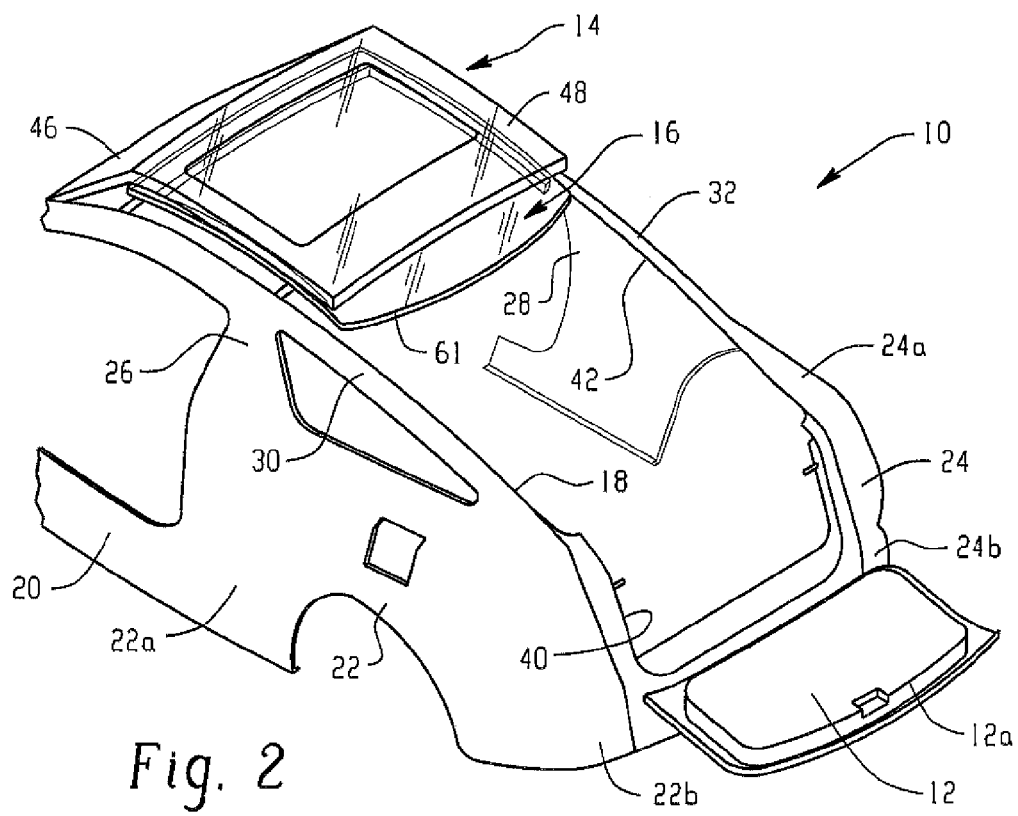
FIG. 2 is a schematic perspective view of the vehicle of FIG. 1 shown with the first closure in a slide open position and a tailgate disposed therebelow in an open position.

Referring now to the drawings wherein the showings are for purposes of illustrating one or more exemplary embodiments and not for purposes of limiting same, FIG. 1 illustrates a vehicle 10 having a tailgate 12, a panoramic roof assembly 14 and a dual-action rear hatch 16, also referred to herein as a rear closure assembly and/or a slide hatch assembly. As shown, the vehicle 10 can be a coupe-type vehicle and/or a hatchback vehicle, such as the type having a rear cargo opening 18 (FIG. 2). More particularly, the vehicle 10 has a vehicle body 20 that defines the cargo opening 18 between a pair of laterally spaced apart rear quarter panels or panel members 22, 24. As shown, the rear quarter panels 22, 24 have side portions 22a, 24a and rear corner portions 22b, 24b. The rear corner portions 22b, 24b define a rear portion of the vehicle body 20 in the illustrated embodiment.

The side portions 22a, 24a of the rear quarter panels 22, 24 include roof support members, including forward roof support members 26, 28 and rearward roof support members 30, 32. The forward roof support members 26, 28 can be the C-pillars of the vehicle body 20 and the rearward roof support members can be roof rails extending between the C-pillars and the rear corner portions 22b, 24b. More specifically, in the illustrated embodiment, the rearward roof support members 30, 32 are angularly oriented roof rails 30, 32 that have lower ends connected to the corner portions 22b, 24b and upper ends connected to the upper ends of the C-pillars 26, 28. The roof rails 30, 32 extend upward from the rear corner portions 22b 24b and thus extend from the rear portion of the vehicle body 20 defined by the rear corner portions 22b, 24b. As illustrated, the sliding hatch 16 extends laterally between rear quarter panels 22, 24 of the vehicle body 20 and extends longitudinally from the C-pillars 26, 28 of the vehicle body 20 to an upper edge 12a of the tailgate 12 of the vehicle. In the illustrated embodiment, the sliding hatch 16 extends downward at an angle from the C-pillars 26, 28 to the upper edge 12a of the tailgate 12.

With additional reference to FIG. 2, the rear cargo opening 18 has a rearward portion 40 and a forward portion 42. The forward portion 42 is contiguous with the rearward portion 40 to form the opening 18 as a relatively large opening in the vehicle body 20 on the vehicle 10. The rear quarter panels 22, 24 define lateral sides of the rear cargo opening 18, including lateral sides of each of the rearward portion 40 and the forward portion 42. In particular, the forward portion 42 of the cargo opening 18 is defined between the roof support members 30, 32 above the rear corner portions 22b, 24b. The rear or rearward portion 42 of the cargo opening 18 is defined between the rear corner portions 22b, 24b below the lower ends of the rear roof support members 30, 32. Accordingly, the rear roof support members 30, 32 define lateral sides of the forward portion 40 of the cargo opening 18 and the rear corner portions 22b, 24b define lateral sides of the rearward portion 42 of the cargo opening 18 at the rear of the vehicle 10.

Figure 3:
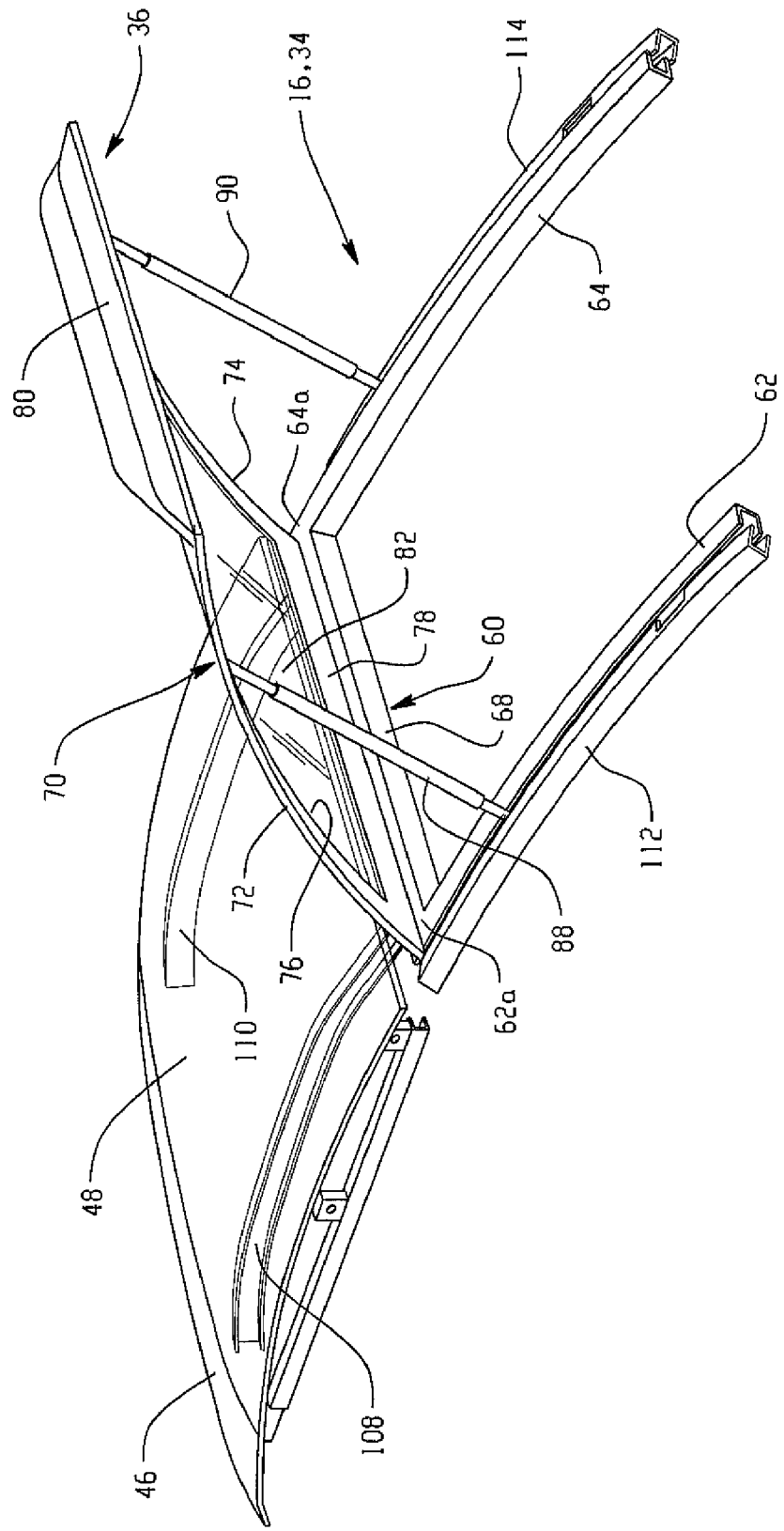
FIG. 3 is partial schematic perspective view of the vehicle of FIG. 1 showing the second closure in a pivot open position.
Figure 4:
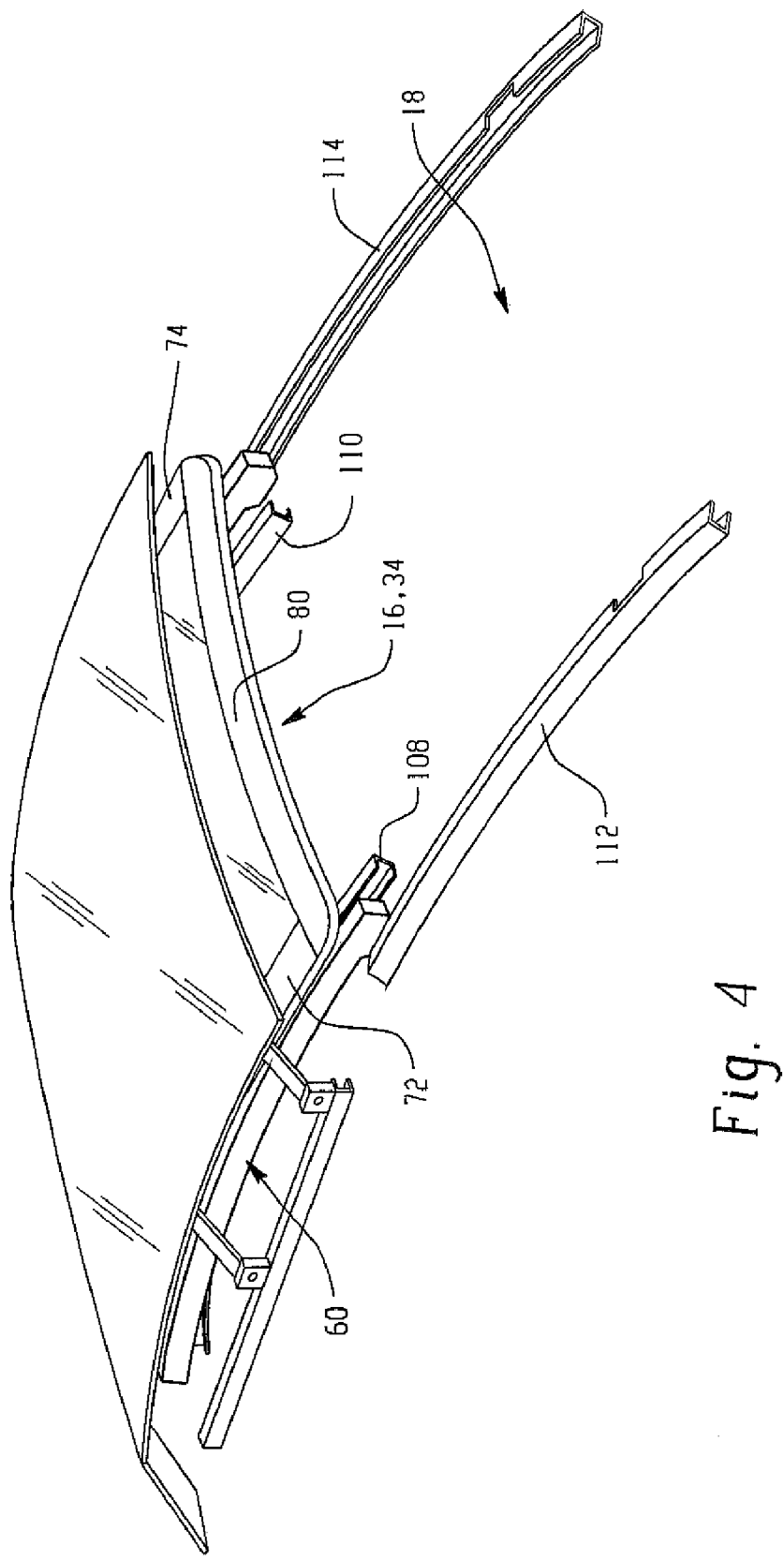
FIG. 4 is a partial schematic perspective view of the vehicle of FIG. 1 showing the first closure in a slide open position.

With additional reference to FIGS. 3-4, the rear closure assembly 16 includes a first closure 34 slidably mounted to the vehicle body 20 of the vehicle 10 for movement between a slide closed position (FIG. 1) and a slide open position (FIG. 4). The closure assembly 16, and particularly the first closure 34 thereof, further includes a second closure 36 pivotally mounted to the first closure 34 for movement between a pivot closed position (FIG. 1) and a pivot open position (FIG. 2). By this arrangement, the rear closure assembly 16 can selectively close the rear cargo opening 18. More particularly, the first closure 34 is a sliding hatch that is slidably mounted to the vehicle body 20 and the second closure 36 is a hatch closure pivotally mounted to the sliding hatch 16.

In the illustrated embodiment, the roof assembly 14 is a dual-panel assembly including a forward panel 46 and a rearward panel 48 hingedly connected to the forward panel 46 along adjacent edges of the panels 46, 48. The roof assembly 14, including the panels 46, 48, is disposed forward of the closure assembly 16 on the vehicle body 20. At least the rearward panel 48 is movable from the illustrated closed position of FIG. 1 to one or more of raised positions (e.g., the raised positions shown in FIGS. 2 and 4) wherein the roof panel 48 is raised from the vehicle body 20 for accommodating the closure assembly 16 (including the hatch frame 60) below the roof panel 48 when the slide closure 34 is moved to the slide open position. The hatch 16 can have a sliding mode wherein the hatch 16 slidably movable from the closed position shown in FIG. 1 to a slide forward or open position shown in FIGS. 2 and 4. In the slide open position, the rear hatch 16 is received under the roof assembly 14 with the roof assembly 14 in one of its raised positions. The hatch 16 can also have a flip-open mode wherein the rear hatch 16, and particularly the second closure 36, is flipped-open as shown in FIG. 3 while the rear hatch 16 remains in the slide closed position. This also provides access through the forward portion 42.

Figure 5:
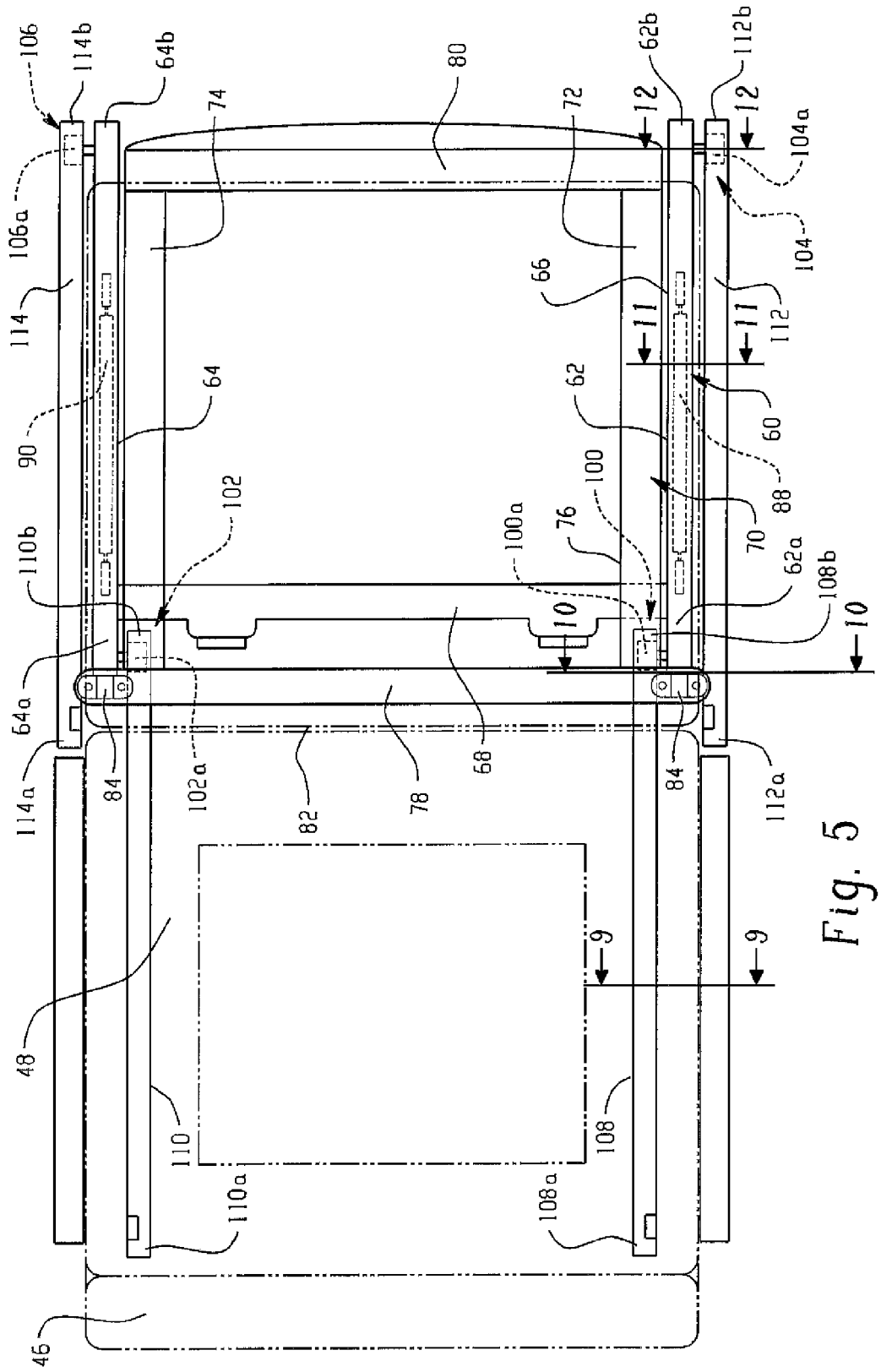
FIG. 5 is a partial schematic plan view showing the first closure slidably mounted to front and rear rails, which are themselves mounted to the vehicle body.

With further reference to FIG. 5, the sliding hatch 16 includes a hatch frame 60 slidably mounted to the vehicle body 20 and the hatch closure 36 pivotally mounted to the hatch frame 60. The hatch frame 60 slidably moves between the slide closed position and the slide open position, whereas the hatch closure 36 pivotally moves between the pivot closed position and the pivot open position. The hatch frame 60 of the illustrated embodiment includes spaced apart lateral side frame members 62, 64 defining a hatch opening 66 therebetween, the hatch opening 66 being a portion of the rear cargo opening 18. The side frame members 62, 64 extend along and adjacent the rear quarter panels 22, 24. The hatch frame 60 further includes an upper cross member 68 extending laterally between upper ends 62a, 64a of the lateral side frame members 62, 64. By this arrangement, the hatch frame 60 has a generally inverted U-shape formed by the lateral side frame members 62, 64 and the upper cross member 68 with an open end disposed rearwardly on the vehicle body 20.

As mentioned, the hatch closure 36 is pivotally mounted to the sliding hatch 16 for movement between the pivot closed position and the pivot open position, particularly when the hatch frame 60 is in the slide closed position. In particular, the hatch closure 36 is mounted to the lateral side frame members 62, 64 and closes the hatch opening 66 defined therebetween when in the pivot closed position. The hatch closure 36 includes a hatch closure or flip frame 70 having a pair of laterally spaced apart lateral side members 72, 74 defining a window opening 76 therebetween. The flip frame 70 further includes spaced apart cross members 78, 80 extending laterally between the lateral side members 72, 74 to further define the window opening 76. A window panel 82 spans across the window opening 76 and between the lateral side frame members 62, 64. The window panel 82 is supported by the side members 72, 74 and the cross members 78, 80.

The hatch closure 36, and particularly the flip frame 70, is pivotally mounted to the sliding hatch 16 by hinges 84 disposed adjacent the upper ends 62a, 64a of the side frame members 24, 26. In particular, spaced apart hinges 84 pivotally mount the hatch closure 36 to the upper ends 62a, 64a of the lateral side frame members 72, 74. This allows the hatch closure 36, and particularly its hatch frame 70, to pivot from the pivot closed position of FIG. 1 to the pivot open position of FIG. 2. As shown, dampers 88, 90 can respectively mount the side members 72, 74 of the pivot hatch 36 to the lateral side members 62, 64 of the slide frame 60.

The slide hatch assembly 16 includes at least one front rail or track (e.g., rails 108, 110) mounted to the vehicle body 20 and at least one rear rail or track (e.g., rails 112, 114) mounted to the vehicle body 20. In addition, the sliding hatch assembly 16 includes at least one front roller assembly (e.g., 100, 102) slidably connecting the hatch frame 60 to the at least one front rail and at least one rear roller assembly (e.g., 104, 106) slidably connecting the hatch frame 60 to the at least one rear rail. In the illustrated embodiment, the at least one rear rail is a pair of rear rails 112, 114 laterally flanking the hatch frame 60 (i.e., mounted laterally outside the side frame members 62, 64) and the at least one front rail is a pair of front rails spaced laterally inwardly relative to the pair of rear rails 112, 114 and laterally inwardly (i.e., laterally inside) relative to the lateral side frame members 62, 64 of the hatch frame 60. The rear rails 112, 114 can be fixedly mounted to the vehicle body 20 along the lateral edges (i.e., roof members 30, 32) defining the rear opening 18 and the front rails 108, 110 can be fixedly mounted to the vehicle body 20 forward of the rear opening 18 under or below the roof panel 48 of the roof assembly 14.

Also in the illustrated embodiment, the at least one front roller assembly is a pair of front roller assemblies 100, 102 and the at least one rear roller assembly is a pair of rear roller assemblies 104, 106. The pair of front roller assemblies 100, 102 can be respectively mounted at or adjacent the front ends 62a, 64a of the side frame members 62, 64 and the pair of rear roller assemblies 104, 106 can be respectively mounted at or adjacent the rear ends 62b, 64b of the side frame members 62, 64. The roller assemblies 100-106 slidably mount the sliding closure 34 to the front rails 108, 110 and the rear rails 112, 114 for sliding movement therealong. In particular, the pair of laterally spaced apart front rails 108, 110 each have an adjacent front roller 100a, 102a from the pair of front roller assemblies received therein and the pair of laterally spaced apart rear rails 112, 114 each have an adjacent rear roller 104a, 106a from the pair of rear roller assemblies received therein. The rollers 100a, 102a, 104a, 106a roll along their respective tracks 108-114 to allow the sliding closure 34 to slidably move relative to the vehicle body 20.

Figure 8:
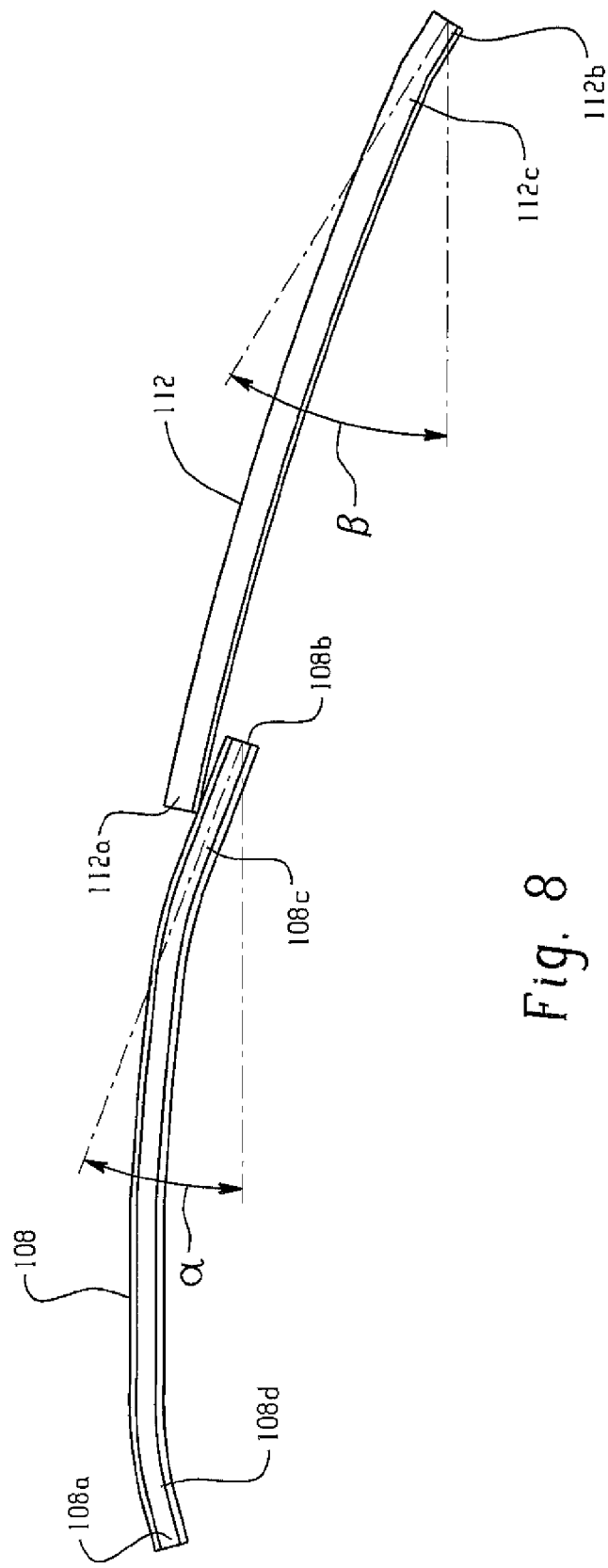
FIG. 8 is a schematic elevation view showing one lateral pair of front and rear rails in isolation.
Figure 9:
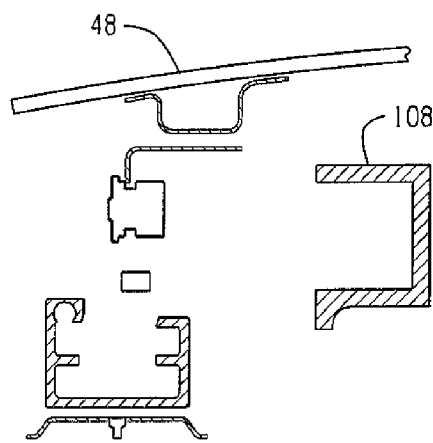
FIG. 9 is a sectional view of the rails taken at the line 9-9 of FIG. 8.
Figure 10:
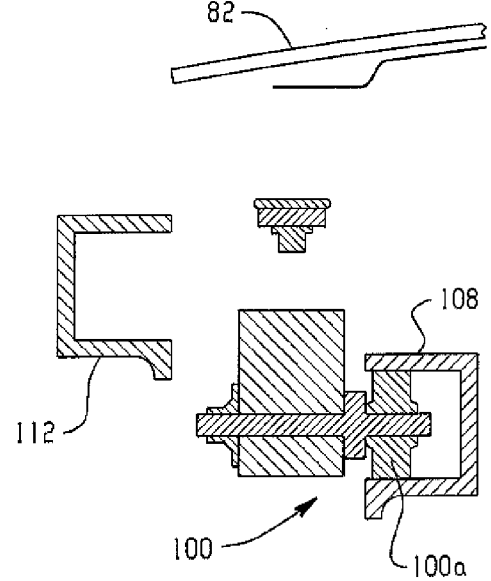
FIG. 10 is a sectional view of the rails taken at the line 10-10 of FIG. 8.
Figure 11:
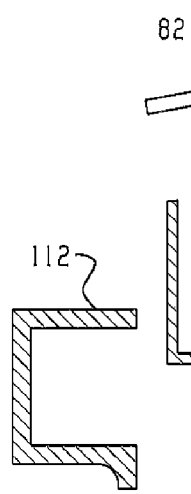
FIG. 11 is a sectional view of the rails taken at the line 11-11 of FIG. 8.
Figure 12:
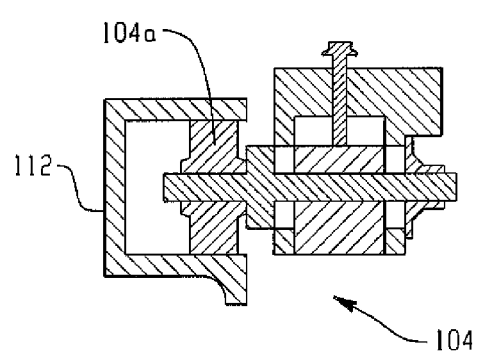
FIG. 12 is a sectional view of the rails taken at the line 12-12 of FIG. 8.

The front rails 108, 110 include forward or front ends 108a, 110a and rear ends 108b, 110b. Likewise, the rear rails 112, 114 include forward or front ends 112a, 114a and rear ends 112b, 114b. As shown in FIG. 8 for the rails 108 and 112, the front ends 112a, 114a of the rear rails 112, 114 are elevated relative to the rear ends 108b, 110b of the front rails 108, 110. The lateral sets of rails (i.e., first set 108, 112 disposed on one lateral side of the slide closure 34 and second set 110, 114 disposed on the opposite lateral side of the slide closure 34) can be identical in construction and mirrored in orientation. Likewise, the front and rear roller assemblies 100, 102 and 104, 106 associated with the two sets of rails 108, 100 and 112, 114 can be identical in construction and mirrored in orientation. Accordingly, further details are provided only in connection with the first lateral set 108, 112 and the roller assemblies 100, 104 corresponding thereto, but all details are applicable to the second lateral set of rails 110, 114 and their roller assemblies 102, 106 unless otherwise indicated herein.

The rails 108, 112 can each include a lifting section 108c, 112c disposed, respectively, adjacent the rear ends 108b, 112b of the rails 108, 112. The lifting sections 108, 112c can be oriented at a relatively steep angle, such as relative to a horizontal plane, for quickly elevating the slide closure 34 as it is initially slid along the rails 108-114. For example, the lifting section 108c can be oriented at an angle α, which is approximately 25° in the illustrated embodiment, and the lifting section 112c can be oriented at an angle β, which is approximately 35° in the illustrated embodiment. By comparison, the remainder of rail 112 is oriented at approximately 25° relative to a horizontal plane and most of the rail 108 is approximately parallel or has an include of less than 5° relative to a horizontal plane. A decline section 108d can be disposed adjacent end 108a for urging the sliding closure 34 toward its fully opened position when the roller 100a is adjacent the forward end 108a. The decline section 108d can be oriented at a negative angle of approximately 5° to 10° relative to a horizontal plane.

With further reference to FIGS. 9-12, the front rail 108 can have a "U" or "C" shape with an open end facing laterally outward for receiving the roller 100a of the roller assembly 100. Likewise, the rear rail 112 can have a "U" or "C" shape with an open end for receiving the roller 104a of the roller assembly 104, though the open end of the rear rail can face laterally inward. In accordance with the orientation of the rails 108, 112, the roller assembly 100 can have its roller 100a protruding laterally inwardly for receipt in the rail 108 and the roller assembly 104 can have its roller 104a protruding laterally outwardly for receipt in the rail 112. By this arrangement, the slide frame 60 is captured between the rails 108-114 and prevented from significant laterally movement. It should, however, be appreciated by those skilled in the art that the rails and roller assemblies can have alternate configurations and need not be constructed exactly as shown and described herein (e.g., the roller assemblies could have multiple rollers, the open sides of the rails could be reversed, etc.).

Figure 6:
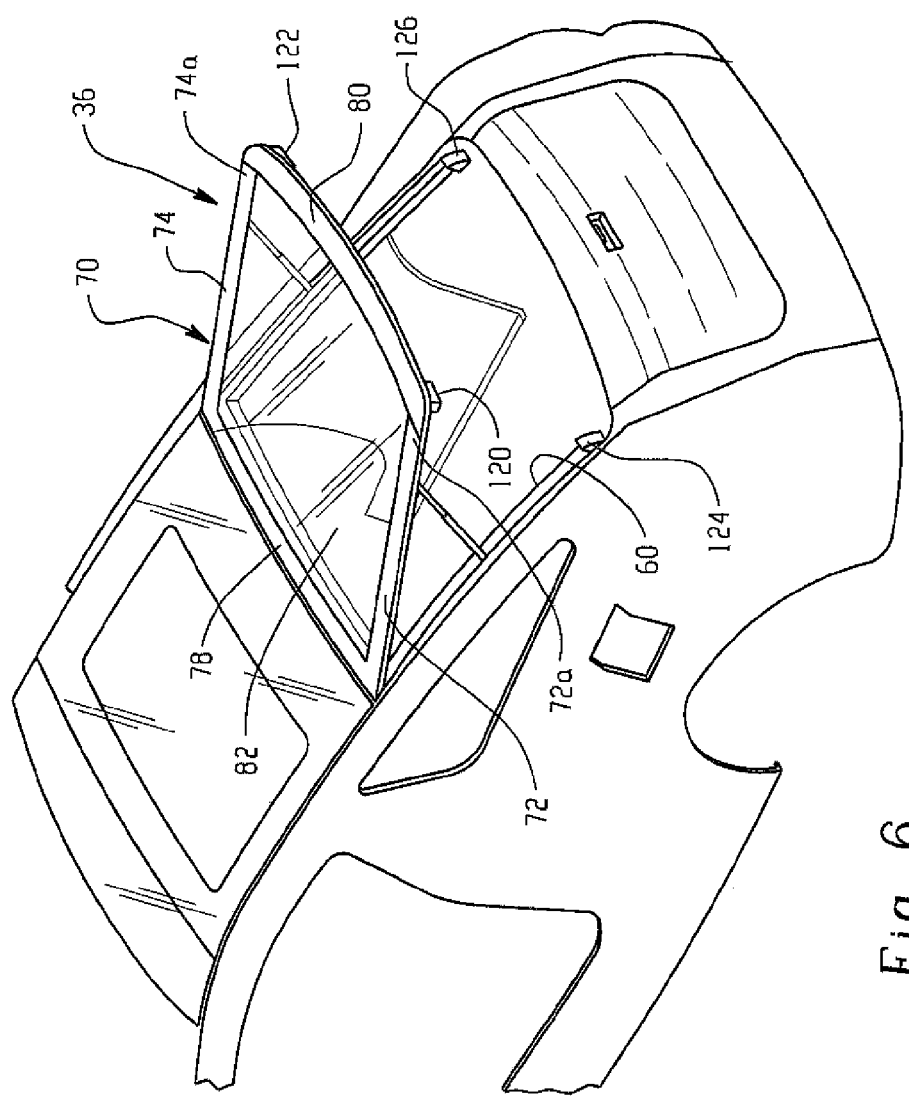
FIG. 6 is a schematic perspective view similar to FIG. 1, but showing the second closure in the pivot open position and schematically illustrating latches and strikers for the second closure.

With additional reference to FIG. 6, one of a striker or a latch can be disposed on the hatch closure 36 adjacent a lower end thereof and the other of the striker or latch can be disposed on the hatch frame 60 adjacent a lower end thereof so that the latch can selectively latch onto the striker for latching the hatch closure 36 in its pivot closed position. In the illustrated embodiment, the lateral side members 72, 74 of the flip frame 70 each include latches 120, 122 adjacent lower ends 72a, 74a of the lateral side members 72, 74 that selectively latch onto corresponding strikers 124, 126 mounted on the hatch frame 60. The latches 120, 122 latch onto respective strikers 124, 126 when the hatch closure 36 is moved to its pivot closed position. Powered actuators 120a, 122a can be operatively connected, respectively, to each latch 120, 122 for powered operation and/or locking of the latch. Operation of the latches and actuators is generally known and understood by those skilled in the art and therefore is not described in further detail herein.

Figure 7:
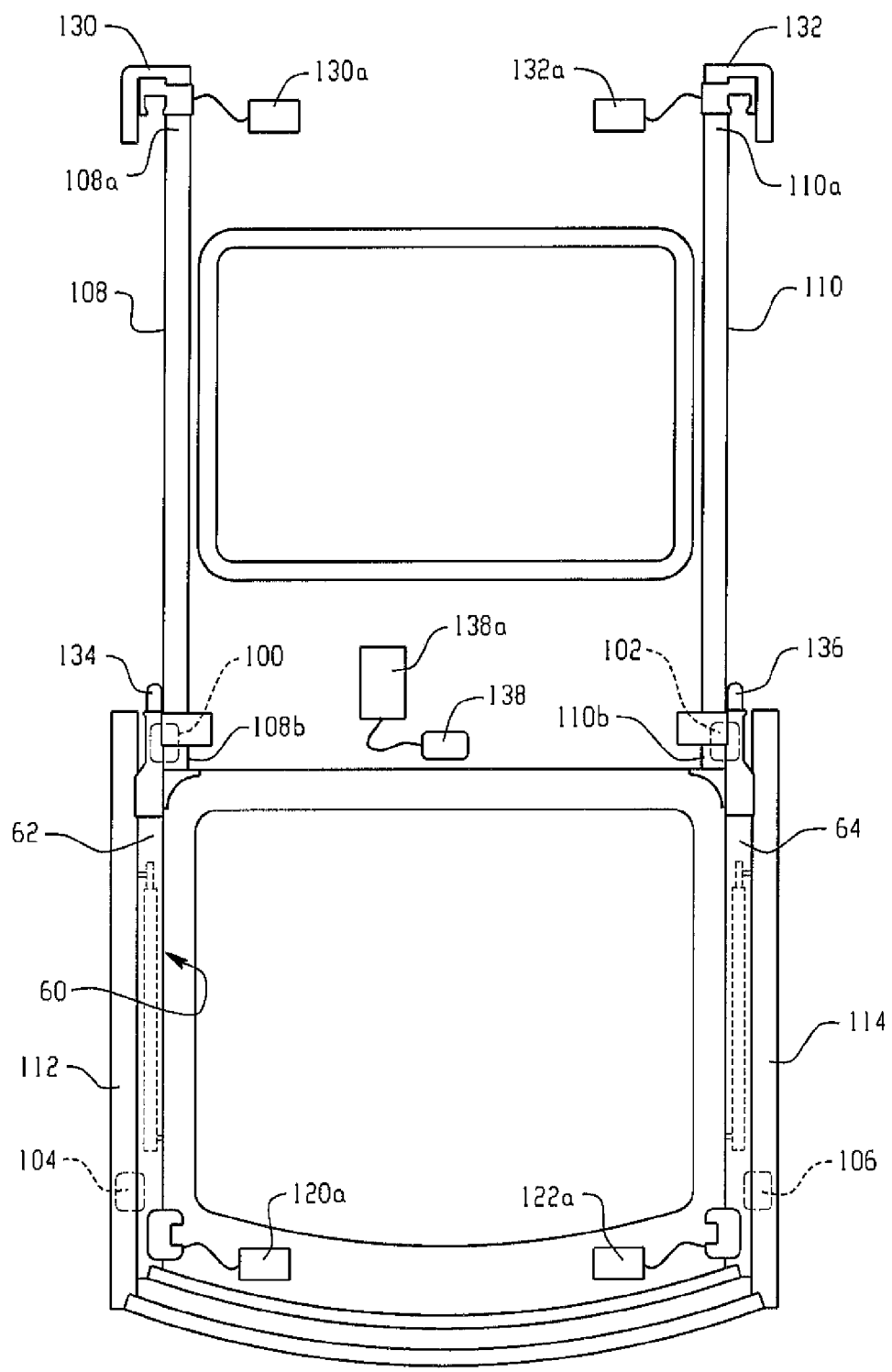
FIG. 7 is another schematic plan view schematically illustrating the locations for latches and strikers for the first closure.

With additional reference to FIG. 7, one of a striker or latch can also be disposed on the hatch frame 60 and the other of the striker or latch disposed on the vehicle body 20, wherein this latch selectively latches onto the striker for latching the slide frame in its closed position. More particularly, in the illustrated embodiment, latches 130, 132 are mounted at forward ends 108a, 110a of the front tracks 108, 110 and strikers 134, 136 are mounted to the hatch frame 60 at the upper ends 62a, 64a of the side frame members 62, 64. The latches 130, 132 latch onto the strikers 134, 136 when the slide frame 60 is moved to the slide open position to latch the slide frame 60 in the slide open position. Another latch 138 can be mounted on the vehicle body 20 (mounting not shown) between the front rails 108, 110 longitudinally adjacent rear ends 108b, 110b of the rails 108, 110. The latch 138 can selectively latch onto a striker (not shown) mounted on the hatch frame 60. Powered actuators 130a, 132a, 138a can be operatively connected, respectively, to each latch 134, 136, 138 for powered operation and/or locking of the latch. Again, operation of the latches and actuators is generally known and understood by those skilled in the art and therefore is not described in further detail herein.

In operation, the tailgate 12 and/or the rear hatch 16 can be opened for providing access through the rear cargo opening 18. For example, the sliding hatch 16 can be moved between the slide closed position of FIG. 1 and the slide open position of FIG. 3. When both the tailgate 12 is in the open position and the hatch 16 is in the slide open position, the vehicle 10 is transformed into a vehicle with truck-like cargo carrying capability, while the vehicle 10 can still remain as a coupe-type or other compact vehicle. Accordingly, in a coupe-type vehicle or other small vehicle, large cargo carrying capability is provided. The latches 130, 132 can latch onto the strikers 134, 136 for holding the first closure 34 in the slide open position and the latch 138 can latch onto the body mounted striker for holding the first closure in the slide closed position. Alternatively, when the slide hatch 16 is in the slide closed position, the hatch closure 62 can be moved or pivoted to the pivot open position as shown in FIG. 3 to provide access through the cargo opening 18, particularly through the hatch opening. The latches 120, 122 can latch onto the strikers 124, 126 for latching closed the hatch closure 36.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A slide hatch assembly for selectively closing a rear cargo opening on a vehicle, comprising:
 a hatch frame slidably mounted to a vehicle body of the vehicle;
 at least one front rail mounted to the vehicle body;
 at least one rear rail mounted to the vehicle body;
 at least one front roller assembly slidably connecting the hatch frame to the at least one front rail; and
 at least one rear roller assembly slidably connecting the hatch frame to the at least one rear rail,
 wherein a front end portion of the at least one rear rail longitudinally overlaps a rear end portion of the at least one front rail such that the front end portion is elevated relative to the rear end portion.

2. The slide hatch assembly of claim 1 wherein the at least one rear rail is a pair of rear rails laterally flanking the hatch frame.

3. The slide hatch assembly of claim 2 wherein the at least one front rail is a pair of front rails spaced laterally inwardly relative to the pair of rear rails.

4. The slide hatch assembly of claim 1 wherein the hatch frame includes:
 spaced apart lateral side frame members; and
 an upper cross member extending between upper ends of the lateral side frame members, the spaced apart lateral side frame members and the upper cross member defining an open end disposed rearwardly on the vehicle body.

5. The slide hatch assembly of claim 4 wherein the at least one front rail is a pair of front rails spaced laterally inwardly relative to the lateral side frame members.

6. The slide hatch assembly of claim 4 wherein the hatch frame has a generally inverted U-shape formed by the lateral side frame members and the upper cross member with an open end disposed rearwardly on the vehicle body.

7. The slide hatch assembly of claim 4 further including:
 a window panel spanning between the lateral side frame members.

8. The slide hatch assembly of claim 1 wherein each of the at least one front rail has a U-shape for receiving a roller of the at least one front roller assembly with an open end facing laterally outward and wherein each of the at least one rear rail has a U-shape for receiving a roller of the at least one rear roller assembly with an open end facing laterally inward.

9. The slide hatch assembly of claim 8 wherein the hatch frame includes:
 spaced apart lateral side frame members; and
 an upper cross member extending between upper ends of the lateral side frame members.

10. The slide hatch assembly of claim 1 wherein the at least one front rail is disposed forward of the cargo opening below a roof panel member of the vehicle body.

11. The slide hatch assembly of claim 10 wherein the roof panel member moves between a closed position and a raised open position wherein the roof panel member is raised from the vehicle body for accommodating the hatch frame below the roof panel member when the hatch frame is in the open position.

12. A slide hatch assembly for a vehicle, comprising:
 a hatch frame having a pair of front roller assemblies and a pair of rear roller assemblies;
 a pair of laterally spaced apart front rails each having an adjacent front roller from the pair of front roller assemblies received therein; and
 a pair of laterally spaced apart rear rails each having an adjacent rear roller from the pair of rear roller assemblies received therein, the pair of laterally spaced apart rear rails flank the pair of laterally spaced apart front rails and the pair of laterally spaced apart front rails disposed inside the vehicle below a roof panel disposed forward of a rear opening selectively covered by the hatch frame.

13. The slide hatch assembly of claim 12 wherein the hatch frame includes a pair of laterally spaced apart side frame members, the pair of front roller assemblies respectively mounted at or adjacent front ends of the side frame members and the pair of rear roller assemblies respectively mounted at or adjacent rear ends of the side frame members.

14. The slide hatch assembly of claim 13 wherein the pair of laterally spaced apart rear rails are mounted laterally outside the side frame members and the pair of laterally spaced apart front rails are mounted laterally inside the side frame members.

15. The slide hatch assembly of claim 14 wherein each of the pair of rear rails has a C-shape with an open end inwardly facing and each of the pair of front rails has a C-shape with an open end outwardly facing.

16. The slide hatch assembly of claim 15 wherein the rollers of the rear roller assemblies are received within the C-shape of the rear rails and the rollers of the front roller assemblies are received within the C-shape of the front rails.

17. The slide hatch assembly of claim 12 wherein front ends of the pair of rear rails longitudinally overlap rear ends of the pair of front rails.

18. The slide hatch assembly of claim 17 wherein the front ends of the pair of rear rails are elevated relative to the rear ends of the front rails.

19. The slide hatch assembly of claim 12 further including:
 one of a pair of strikers or latches disposed adjacent a forward edge of the hatch frame for sliding movement therewith; and
 the other of the pair of strikers or latches disposed adjacent forward ends of the pair of front rails, the latches selectively latching the strikers.

20. A vehicle having a rear opening selectively closed by a sliding hatch, comprising:
 a vehicle body defining the rear opening;
 rear rails fixedly mounted to the vehicle body along lateral edges defining the rear opening;

front rails fixedly mounted to the vehicle body forward of the rear opening;

roller assemblies slidably mounting the sliding hatch to the rear rails and the front rails for sliding movement therealong, wherein each of the pair of rear rails has a C-shape with an open end inwardly facing and each of the pair of front rails has a C-shape with an open end outwardly facing, the pair of front rails arranged inside the vehicle body forward of the rear opening for receiving the sliding hatch inside the vehicle below a roof panel disposed forward of the rear opening.

* * * * *